(12) United States Patent
Lehner et al.

(10) Patent No.: US 6,372,011 B1
(45) Date of Patent: Apr. 16, 2002

(54) METHOD FOR PRODUCING AN IRON MELT USING IRON-CONTAINING RESIDUAL SMELTING PLANT MATERIALS

(75) Inventors: Johann Lehner, Linz; Alexander Fleischanderl, Gruenau; Wilfried Pirklbauer, Niederneukirchen; Stefan Dimitrov, Linz, all of (AT)

(73) Assignee: Voest Alpine Industrieanlagenbau GmbH (AT)

( * ) Notice: Subject to any disclaimer, the term of this patent is extended or adjusted under 35 U.S.C. 154(b) by 0 days.

(21) Appl. No.: 09/446,473
(22) PCT Filed: Jun. 15, 1998
(86) PCT No.: PCT/AT98/00145
§ 371 Date: Dec. 20, 1999
§ 102(e) Date: Dec. 20, 1999
(87) PCT Pub. No.: WO98/58091
PCT Pub. Date: Dec. 23, 1998

(30) Foreign Application Priority Data

Jun. 18, 1997 (AT) .................................................. 1059/97

(51) Int. Cl.$^7$ ............................. C21B 11/10; C22B 1/14
(52) U.S. Cl. ..................... 75/10.58; 75/10.63; 75/770; 75/962
(58) Field of Search ................. 75/10.63, 962, 75/770, 10.58, 549, 773

(56) References Cited

U.S. PATENT DOCUMENTS

| | | | |
|---|---|---|---|
| 3,925,060 A | * 12/1975 | Bloom et al. | 75/10.63 |
| 4,119,455 A | 10/1978 | Cass et al. | |
| RE30,795 E | 11/1981 | Kreiger | 75/256 |
| 4,326,883 A | * 4/1982 | Schwarz | 75/750 |
| 4,407,672 A | 10/1983 | Deuschle et al. | |
| 4,940,487 A | 7/1990 | Lugscheider et al. | 75/384 |
| 5,004,496 A | * 4/1991 | Aune et al. | 75/10.28 |
| 5,100,464 A | 3/1992 | Kelly et al. | |
| 5,186,742 A | 2/1993 | Hoffman et al. | 75/773 |
| 5,695,543 A | * 12/1997 | Shields | 75/10.63 |
| 6,077,324 A | * 6/2000 | Fritz | 75/10.12 |
| 6,102,982 A | * 8/2000 | Isozaki et al. | 75/500 |

FOREIGN PATENT DOCUMENTS

| | | |
|---|---|---|
| AT | 376241 | 10/1984 |
| AT | 380901 | 7/1986 |
| DE | 3150291 | 6/1983 |
| DE | 4123626 | 1/1993 |
| EP | 0623684 | 11/1994 |
| EP | 0657549 | 6/1995 |
| EP | 0657552 | 6/1995 |
| FR | 2497235 | 7/1982 |
| WO | 9634120 | 10/1996 |
| WO | 9858091 | 12/1998 |

OTHER PUBLICATIONS

Alta Vista translation of the "Objective" (Zielsetzung) section of Kaas et al, Stahl und Eisen, 104(1984) p. 357.*
Alta Vista translation of Claim 1 of Broggi et al (FR 2,497,235), Jul. 1982.*
Alta Vista translation of the abstract of Dahlke et al (DE 4123626 A1), Jan. 1993, 5 pages.*
Database WPI, Section Ch, Week 7907, Derwent Publications Ltd., London, GB; Class M24, AN 79–12681b, XP002079088 & JP 54 001216 A (Daido Tokushuku KK), Jan. 8, 1979, see abstract.
Kaas W. et al., "Erzeugung und Verarbeitung armierter Filterstaubbriketts aus der Edelstahlerzeugung", *Stahl und Eisen*, vol. 104, no. 7, Apr. 2, 1984, pp. 357–362, XP002079087, Düsseldorf, Germany, p. 361, figures 6, 9.

* cited by examiner

Primary Examiner—Roy King
Assistant Examiner—Tima McGuthry-Banks
(74) Attorney, Agent, or Firm—Ostrolenk, Faber, Gerb & Soffen, LLP

(57) ABSTRACT

For effectively reprocessing iron-containing residual smelting plant materials (1 to 3), in which iron may be present both in metallic form and in oxidic form, with lowest possible energy expenditure, the residual smelting plant materials (1 to 3) are processed into agglomerates (8,11), the agglomerates (8,11) are charged into an electric arc furnace (10), melted there and reduced, and the resultant melt is refined (FIG. 1).

13 Claims, 3 Drawing Sheets

METHOD FOR PRODUCING AN IRON MELT USING IRON-CONTAINING RESIDUAL SMELTING PLANT MATERIALS

The invention concerns a method for producing an iron melt, in particular a crude steel melt, using iron-containing residual smelting plant materials, and an installation for carrying out the method.

For a process of directly reducing iron ore with subsequent melting down of iron sponge and simultaneous coal gasification, it is known (AT-B-376,241) to separate particulate solids, primarily consisting of carbon in dust form, from the reduction gas formed in a fusion gasification zone and from the waste gas produced during direct reduction, to mix the separated particulate solids with binder, including with iron oxide dust, to make formed coke by hot-briquetting and subsequently to feed the formed coke back to the melting-down process.

It is disadvantageous in this case, however, that, because of the introduction of iron oxides in the fusion gasifier, reduction work has to be performed in order to reduce the iron oxide, whereby energy required for the melting-down process is taken from the said iron oxide and the process taking place in the fusion gasification zone is disrupted. Furthermore, the said hot-briquetting represents an expensive solution with regard to the investment and operating costs.

It is known from DE-A-41 23 626 to agglomerate residual smelting plant materials of mixed consistency, with the aid of binders, slag-forming constituents and reduction agents, and to introduce the agglomerates into the upper burden region of a melting unit, the preheating and drying of the agglomerates taking place in this burden region of the melting unit. The burden passes through the melting unit on the basis of the counterflow principle, it initially arriving in a reduction region, provided in the interior of the melting unit, and being subsequently melted in the lower region of the melting unit.

This known method is energy-intensive to the extent that metallic scrap or residual materials also have to pass through the reduction region of the melting unit. A particular problem here is the stability of the agglomerates, since these agglomerates are used while still in the green state, that is to say not completely dried, which in practice causes great difficulties due to disintegration, abrasion etc. When passing through the melting unit on the basis of the counterflow principle, destruction of the agglomerates caused by forces of pressure and impact can lead to a high proportion of the said agglomerates being discharged from the melting unit through the waste gas. For this reason, the method known from DE-A-41 23 626 can only be realized with difficulty in practice. Agglomerates with a high stability, which they should also have in the high temperature range, would have to be produced, which in turn is very expensive, however, and would require in particular the use of high-grade and correspondingly expensive binders.

It is known from AT-B-380,901 to convey metal-oxide-containing metallurgical dusts together with carbon-containing material through a rotary tube, to reduce them in a hot zone of the tube and to form iron sponge, and to use this iron sponge in a converter as a substitute for chill scrap. This method has proven successful in the case of metal-oxide-containing metallurgical dusts, but requires additional expenditure on apparatus and process technology to establish a reducing atmosphere. What is more, only metal-oxide-containing metallurgical dusts can be reprocessed; this method is not envisaged for the use of dusts containing high proportions of metallic iron.

A method of the type described at the beginning is likewise known from EP-A-0 623 684. In this case, a complete and energy-saving reprocessing of waste and residual materials of the metallurgical industry is successfully achieved in a method for the direct reduction of iron ore into iron sponge and melting down of the iron sponge in a coal gasification zone, it being necessary however to collect the waste or residual materials separately in groups according to their chemical composition. A first group mainly comprises iron in oxidic form, a second group iron in metallic form and a third group mainly carbon-containing materials. The first group is charged into the direct reduction zone and the second and third groups are charged directly into the fusion gasification zone, charging being preceded by carrying out thickening and granulating of the waste and residual materials occurring in the form of slurries.

In the case of this known method, it is primarily intended to feed the dusts produced in the waste gases during direct reduction or melting-down and during coal gasification back to the direct reduction or the melting-down process and coal-gasification process. This is complex to the extent that the agglomerates are in turn fed back to the same processes from which they originate. They consequently have to be heated up again there and run through these processes as it were a second time, and only subsequently can they be further processed in a downstream process, for example a process for producing steel from pig iron.

It is likewise know from U.S. Pat. No. 5,100,464 to mix residual smelting plant materials, bind them with molasses and to make briquettes in a cold-briquetting process and charge them into a converter.

A method of this type is also know from WO-A-96/34120 as well as U.S. Pat. No. Re. 30,795 and U.S. Pat. No. 4,119,455.

Furthermore, numerous methods of melting down zinc-containing metallurgical dusts are known, in which zinc-containing dusts are melted down by means of electrical energy, such as by means of plasma burners or conventional electric arcs. These methods serve for recovering the zinc, but not for producing an iron melt. These methods are known by the names "Mintek method", "Elkem method", "IMS-Tectronics method" or "Davy McKee method".

It is generally known in the blast-furnace process, oxygen steelmaking process or in the direct reduction of iron ore into iron sponge to separate dusts occurring in the wet process from the waste gases forming during these processes, and to dry the slurries thereby formed, but the slurries are usually subsequently landfilled for reasons of low cost. This has been accepted in the past, since these slurries (as dry substance) only make up approximately 1.5% by weight of the amount of steel produced. However, with increasing environmental awareness, there is increasingly a requirement to avoid such landfill sites. This involves difficulties, however, since—as explained above—reprocessing of the dusts in the metallurgical industry currently requires great effort, such as selection, and the dusts often have to be discharged in turn with waste gases.

The invention is based on the object of effectively reprocessing iron-containing residual smelting plant materials, in which iron may be present both in metallic form and in oxidic form, with lowest possible energy expenditure and with an expenditure on apparatus requiring only low investments, to be specific involving recovery of the iron contained in these residual smelting plant materials and wherever possible allowing technologies successfully proven in practice to be used. In particular, the intention is to avoid the dusts passing repeatedly through process stages provided one after the other in steel production and avoid them having an additional adverse effect on these stages.

This object is achieved according to the invention by the combination of following features:

residual smelting plant materials are processed into agglomerates, the agglomerates are charged into an electric arc furnace, melted and reduced, and the resultant melt is refined.

It is of particular advantage if liquid and/or solid pig iron is additionally charged into the electric arc furnace and is likewise refined, the pig iron expediently being at least partially charged before the residual smelting plant materials. For energy-related reasons, the pig iron is charged in the liquid state. However, it may also be introduced in the form of ingots, either entirely or only in part. Part of the pig iron may also be substituted by scrap. There is also the possibility of substituting pig iron by a carburized liquid pool remaining from the residual melt. Carburizing may take place by adding lump and/or dust coal/coke.

With the method according to the invention, residual smelting plant materials can be successfully processed in large amounts. Residual smelting plant materials are advantageously charged in an amount of preferably approximately 40 to 50% of the total charge.

As the metal product, a crude steel, a semisteel or liquid pig iron can be produced.

However, in regular operation, i.e. with residual smelting plant materials occurring in normal amounts, refining is advantageously carried out up to a carbon content of at most 0.1%, i.e. the metal product is a crude steel.

The method according to the invention is also very well suited for processing rolling scale slurry, this advantageously having the oil removed beforehand, by treating with specific lime additives, such as calcined lime. This measure allows the oil contained in the rolling scale slurry to be chemically dispersed by CaO, before a hydration reaction with water occurs.

Dusts and/or slurries from converter and/or electric arc-furnace operation and/or the pig-iron production installation and/or the direct reduction installation are used in particular for charging as residual smelting plant material.

The residual smelting plant materials are advantageously mixed before charging and have calcined lime added as a binder, whereupon the residual smelting plant materials are agglomerated and the agglomerates are dried to a residual moisture content of less than 5%.

Preferably, first of all pig iron, preferably liquid pig iron, is charged into the electric arc furnace, whereupon the residual smelting plant materials are continuously charged over a predetermined time period and, during this time, the refining process is carried out, refining expediently taking place for a predetermined remaining time, for the vaporizing of zinc, without any charging of residual smelting materials being carried out.

An installation for carrying out the method according to the invention is designed as follows: with a mixing reactor, into which there opens at least one line feeding in residual smelting plant materials, an $H_2O$ feed line and a line feeding in binder, with an agglomerating device, preferably with a drying device, from which the dried agglomerates can be passed to a preferably provided screening device, with an electric arc furnace, into which there leads at least one line feeding in the agglomerates, preferably with a line passing the coarse fraction from the screening device into the electric arc furnace through at least one cover opening and/or a line passing the fine fraction to at least one lance protruding into the electric arc furnace, with a feed for pig iron leading into the electric arc furnace, a tapping opening for the slag and a tapping opening for the iron melt produced.

The installation preferably has a filter system, to which there leads a waste-gas line, extending from the arc furnace, and from which filter system a line for dusts separated from the waste gas leads to the mixing reactor, there expediently extending from the drying device a line carrying away vapours, which leads to the filter system.

BRIEF DESCRIPTION OF THE DRAWINGS

The invention is explained in more detail below on the basis of an exemplary embodiment represented in the drawing.

DESCRIPTION OF THE DRAWINGS

Figure 1:
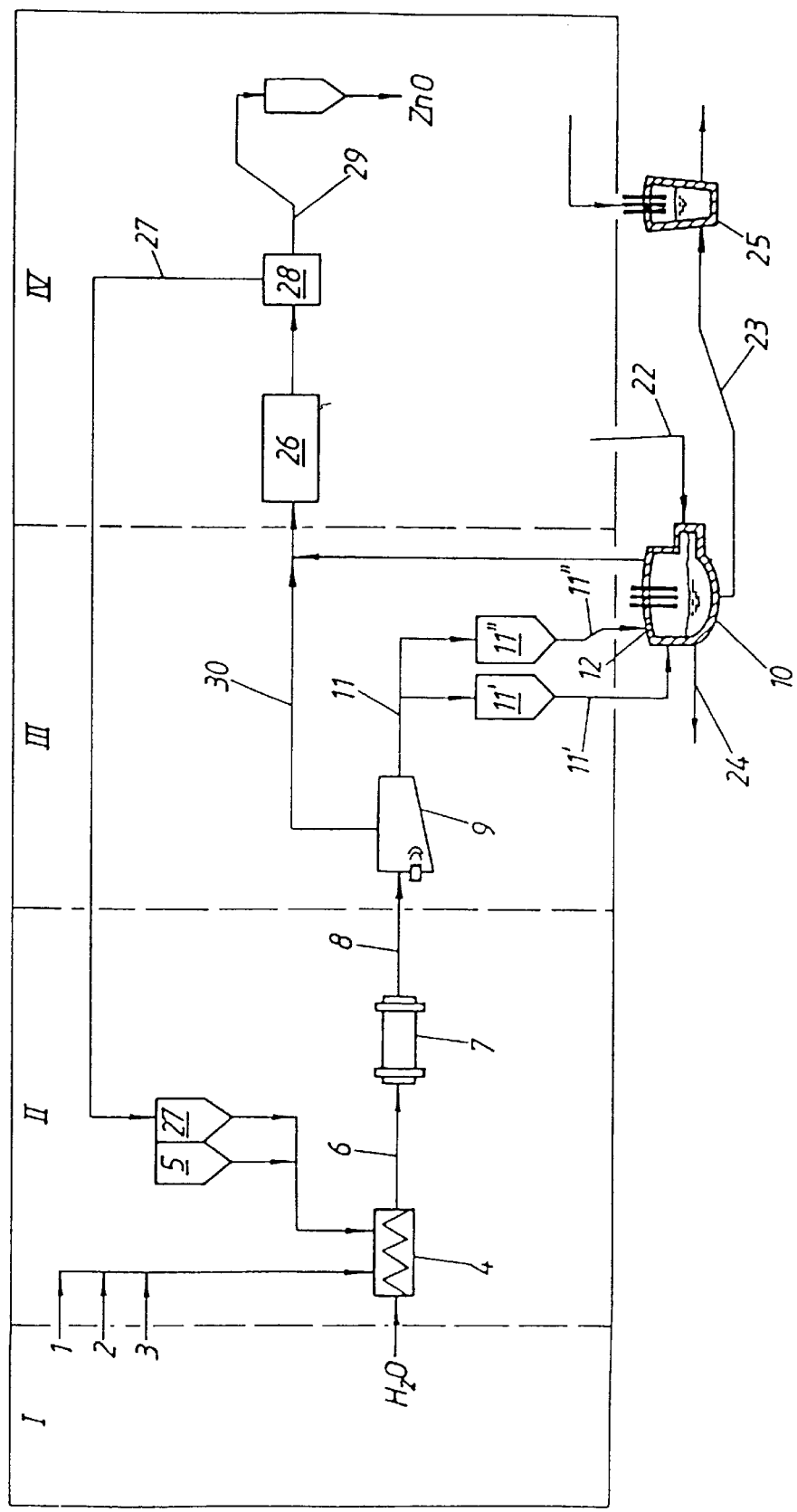
FIG. 1 illustrating the method according to the invention in a schematic flow-sheet representation.

The flow sheet represented in FIG. 1 is subdivided into four areas, which are denoted by I to IV. Listed in area I are the charged materials for carrying out the method according to the invention. Area II concerns the agglomeration and, area III the post-treatment after the agglomeration, before charging into the electric arc furnace. Field IV concerns the waste-gas treatment.

The method according to the invention is suitable for the disposal of all residual smelting plant materials, in particular even oil-containing rolling scale slurry 1, as well as blast-furnace slurry 2 and further dusts 3 from converter operation and from electric arc-furnace operation. These residual smelting plant materials are fed to a mixing reactor 4, in which they are thoroughly mixed, with the addition of water. The oil-containing rolling scale slurry 1 is—if necessary—treated beforehand with calcined lime, whereby the oil is chemically dispersed before a hydration reaction with water occurs. This has the effect of forming a pourable powder, in which the oil is firmly bound. This measure allows the rolling scale slurry 1 to be further processed together with the dusts 3 from converter operation or electric arc-furnace operation and the blast-furnace slurry 2. If appropriate, if it contains a coarse fraction, the powder formed by the dispersion can be separated into a dust fraction and a coarse fraction, the coarse fraction being ground before mixing in with the other residual smelting plant materials 2, 3.

In the mixing reactor 4 there takes place in addition to the mixing of the residual smelting plant materials 1 to 3 also the mixing of calcined lime 5 as a binder, calcined lime 5 preferably being added in an amount equivalent to between 5 and 10%. The moisture content is adjusted by the addition of water to approximately 15% by weight.

As soon as the mixture 6 has reacted, it is transferred into the mixing granulator 7, in which green pellets 8 are formed. Arranged downstream of this mixing granulator 7 there may be a Rollier drum, not shown in the drawing, if green pellets 8 of a specific minimum size are required. The green pellets 8 expediently have a diameter of between 5 and 10 mm and have a moisture content of approximately 15%.

The granulation is followed by a drying of the green pellets, advantageously in an oscillating dryer 9, to a moisture content of <5%. As a result, the green pellets 6 are adequately stable for charging into an electric arc furnace 10. If an oscillating dryer 9 is used, hot air is passed through the flow-applying base and the product layer during the oscillating transport of the green pellets 6 in the direction of the discharge opening of the oscillating dryer, whereby the green pellets 6 are dried to the required maximum moisture content. The air fed to the oscillating dryer is preheated by means of a natural-gas burner system.

The dried pellets 11 are subsequently separated into two screening fractions 11', 11", expediently by an oscillating screening, a coarse fraction 11" of the pellets with a particle size of over 5 mm and a fine fraction 11' with pellets of up to 5 mm being formed. The two fractions 11', 11" are subsequently charged into the electric arc furnace 10, the coarse fraction 11" via at least one cover hole 12 and the fine fraction 11' via lances 13. The ratios of the amounts of the fine fraction 11' and coarse fraction 11" to be charged may be flexible within a wide range for optimum melting operation in the electric arc furnace 10.

Figure 4:
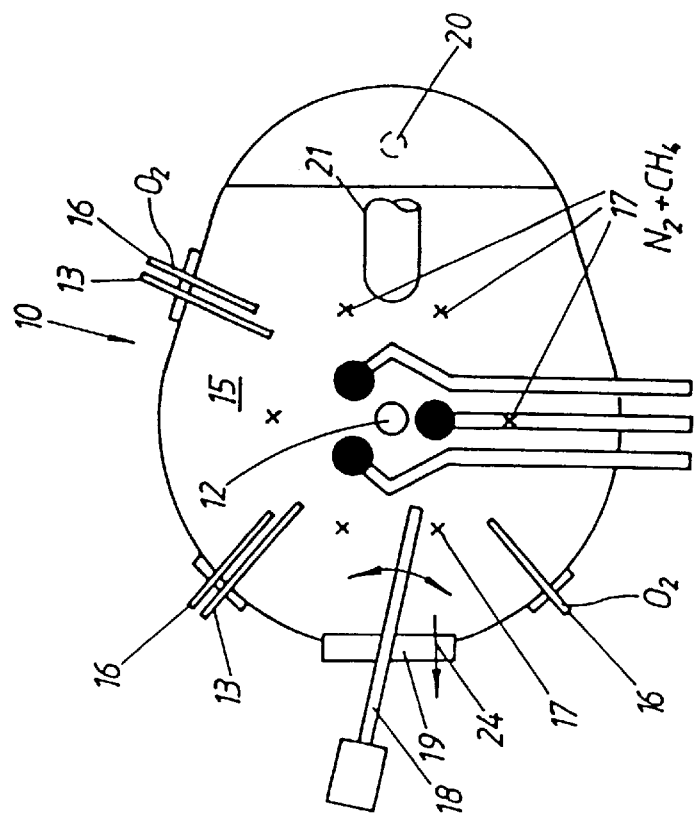
FIG. 4 is a plan view of this furnace in the direction of the arrow IV of FIG. 3.
Figure 3:
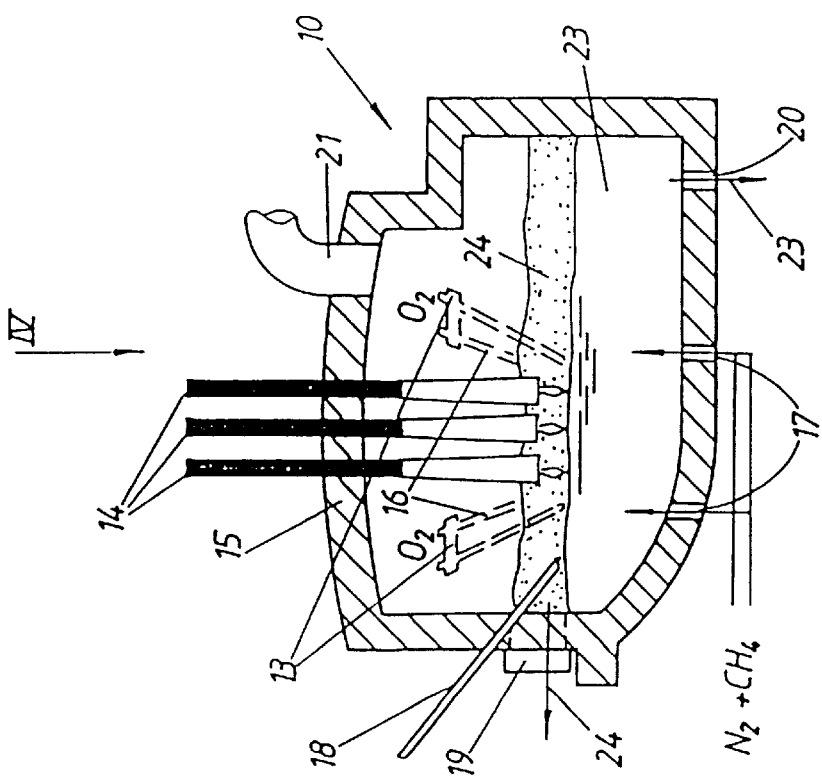
FIG. 3 shows a section through an electric furnace, as used in the case of the method according to the invention.

The electric arc furnace 10 may be operated both as a DC furnace or as an AC furnace. In the case of the exemplary embodiment represented in FIGS. 3 and 4, it is operated on alternating current. Three graphite electrodes 14 protrude through the cover 15 into the interior. The furnace 10 is provided with a cover opening 12 for feeding in the coarse fraction 11" of the residual smelting plant materials 1 to 3 and additives, such as lime, dolomite and other slag-forming constituents as well as lump coal or coke etc.

The fine fraction 11' is introduced—as mentioned—by lances 13 to which air is admitted. In addition, lances 16 are also provided for feeding in oxygen and/or an oxygen-containing gas, such as air. For achieving intensive bath mixing, the electric arc furnace (10) is to be provided with bottom flushing elements, preferably with bottom nozzles 17, with preferably inert gas. Oxygen and coal are introduced into the electric arc furnace 10 by means of a manipulator 18 through the slag door 19.

For carburizing the metal bath, the electric arc furnace (10) may be provided with at least one carbon under-bath nozzle.

The crude steel tap 20 is located on the side of the electric arc furnace 10 opposite the slag tapping opening 19. The waste gas formed in the electric arc furnace is fed via an elbow 21, in a way still to be described later, to the waste-gas post-treatment represented in area IV of FIG. 1.

Introduced first of all into the electric arc furnace is pig iron 22, for example from a blast furnace, preferably in an amount of between 50 and 60% of the total charge. The residual smelting plant materials 1 to 3, that is to say the fine fraction 11' and coarse fraction 11", are subsequently charged into the electric arc furnace 10 over a certain time interval (preferably approximately 60 min). During this time, refining with oxygen is simultaneously carried out. Subsequently, only refining is carried out for a certain time interval, without the addition of residual smelting plant materials 1 to 3, in order for the zinc to be largely vaporized. The tap-to-tap time is approximately 90 to 100 min.

The residual smelting plant materials 1 to 3 generally have a carbon content of approximately 7% by weight, so that when operating with approximately 60% pig iron 22 and 40% residual smelting plant materials 1 to 3, scarcely any additional coal is required for reduction. When operating with foamed slag, the slag tapping takes place continuously after half the tap-to-tap time, approximately 140 kg of slag 24 being produced per tonne of crude steel 23. There are no objections to the slag 24 being reprocessed for building materials, on account of the chemical composition of the slag.

A completely refined high-grade crude steel 23 with less than 0.1% carbon is preferably produced in the electric arc furnace 10.

Typical properties of the crude steel 23:

| | |
|---|---|
| 0.05% | C |
| 0.08% | Mn |
| 0.016% | P |
| 0.073% | S |
| tapping temperature | 1650° C. |

A desulphurization takes place during a subsequent secondary-metallurgical treatment. This secondary-metallurgical treatment advantageously takes place in a ladel furnace 25.

The waste gases from the drying of the green pellets 8 and from the electric arc furnace 10 are fed to a filter system 26, from which the dust 27 occurring is recycled into the reconditioning process for the residual smelting plant materials.

In order to expel the concentrating components (e.g. Zn, Pb etc.), a partial stream 29 may be expelled if it is ascertained by means of laser-optical measurement 28 that a certain content of these components in the dust is exceeded. This partial stream 29 may either be further concentrated or transferred directly to further processors (e.g. zinc smelters).

The method according to the invention has major advantages over the conventional methods:

Considerable proceeds can be earned by processing the residual smelting plant material into an iron-containing melt.

The electric arc furnace 10 used shows great flexibility in the charge ratio of pig iron 24/residual smelting plant materials 1 to 3; consequently, it is easy to respond to fluctuating amounts and compositions of residual smelting plant materials.

According to the wishes of the operator, a refined crude steel 23, a semisteel product or liquid pig iron can be produced.

The dust 27 emitted by the electric arc furnace 10 is recirculated for zinc enrichment until a certain zinc content is obtained. The high zinc enrichment allows the amounts of residual material occurring to be minimized.

In the conditioning of the residual smelting plant materials 1 to 3, no organic substances are introduced via the binders 5.

The high temperature prevents process-related zinc or lead condensation in the electric arc furnace 10. Furthermore, there are no problems with the furnace lining, since the process operates with foamed slag.

At the optimum charge ratio of the charge materials, the slag 24 can be reprocessed as building material. Consequently, no additional landfill costs arise.

The investment costs of the electric arc furnace 10 are lower in comparison with a shaft furnace.

Quick starting up and shutting down of the electric arc furnace 10 presents no problem.

By contrast, a method using a shaft furnace has the disadvantages that quick starting up and shutting down of a shaft furnace is not possible, that a far greater stability of the granulated material, i.e. the pellets, is required, and sometimes cannot be achieved at all, and that temperatures of over 950° C. become necessary to deal with the zinc condensate problem in the shaft outlet zones.

Exemplary Embodiment

Oil-containing rolling scale 1, which has been pretreated with an additive, as well as blast-furnace top gas mud 2, converter dust 3 and lime are introduced into the mixing reactor. Calcined lime is envisaged as the additive for the oil-containing rolling scale 1. The quantitative ratios are reproduced in the following Table I.

TABLE I

| oil-containing rolling scale 1 | 6.9 t/h 50,000 t/a | 8.3 t/h 60,000 t/a |
| calcined lime additive | 1.4 t/h 10,000 t/a | |
| blast-furnace top gas mud 2 | | 6.9 t/h 50,000 t/a |
| converter dust 3 | | 25.0 t/h 180,000 t/a |
| lime | | 3.0 t/h 20,000 t/a |

Altogether, 44.1 t/h or 317,200 t/a are introduced into the mixing reactor 4. Addition of water at a rate of 1 t/h or 7,200 t/a is required. After forming the granules or pellets 8 and transferring the same into the dryer 9, the screening takes place, producing 40 t/h, i.e. 288,000 t/a, of pellets 11, to be precise 19 t/h with a fine fraction 11' and 21 t/h of a coarse fraction 11". That is 136,800 t/a of fine fraction 11' and 151,200 t/a of coarse fraction 11". 4.1 t/h of vapours 30 are formed in the dryer, that is 29,200 t/a. The vapours 30 are likewise passed to the filter system 26.

This fine fraction 11' and coarse fraction 11" is charged into the electric arc furnace 10, which is operated with a charge mix of 60% liquid pig iron 22 and 40% residual smelting plant materials 1, 2, 3. For each tonne of crude steel 23 produced in the electric arc furnace 10, 278 kg of pellets of over 5 mm (coarse fraction 11") are fed in via the cover 15 together with 14.3 kg of lump lime and 14.2 kg of lump dolomite and 250 kg of fine fraction 11', that is to say pellets smaller than 5 mm, are fed in with the aid of 25 Nm$^3$ of compressed air via two lances 13. 26.4 Nm$^3$ of oxygen and 1.7 kg of blasting coal are introduced into the electric arc furnace 10 by means of the manipulator 18. The liquid pig iron 22 is charged in a liquid state at the beginning of the process into the electric arc furnace in an amount of 791 kg, the pig iron 22 containing 4.3% carbon, 0.6% silicon, 0.5% manganese, 0.09% phosphorus and 0.005% sulphur, the remainder being iron.

The pig iron 22 has a temperature of 1320° C. 0.5 NM$^3$ of N$_2$ and 0.5 Nm$^3$ of CH$_4$ are introduced via the bottom nozzles 17 for bath mixing. 14.7 Nm$^3$ of O$_2$ are fed in via three post-combustion lances just underneath the slag surface, so that a partial CO+H$_2$ post-combustion takes place from the primary-produced furnace waste gas, and the resultant energy is transferred efficiently to the metal bath. About 83 Nm$^3$ of infiltrated air likewise get into the electric arc furnace 10. With 500 kWh of electrical energy supplied, 143 kg of slag 24 with the composition specified in Table II form in the said furnace.

TABLE II

| 27.9% | FeO$_n$ |
| about 5% | Fe$_{met}$ |
| CaO/SiO$_2$ | =2.2 |
| 7.1% | MgO |
| <5.4% | Na$_2$O |
| 1.27% | P$_2$O$_5$ |
| 0.42% | S |

1000 kg of crude steel 23 with the chemical composition specified in Table III are tapped. The temperature of the crude steel is 1650° C.

TABLE III

| 0.05% | C |
| 0.08% | Mn |
| 0.016% | P |
| 0.073% | S |
| 120 ppm | Zn |
| 30 ppm | Pb |
| 40 ppm | N |

Figure 2:
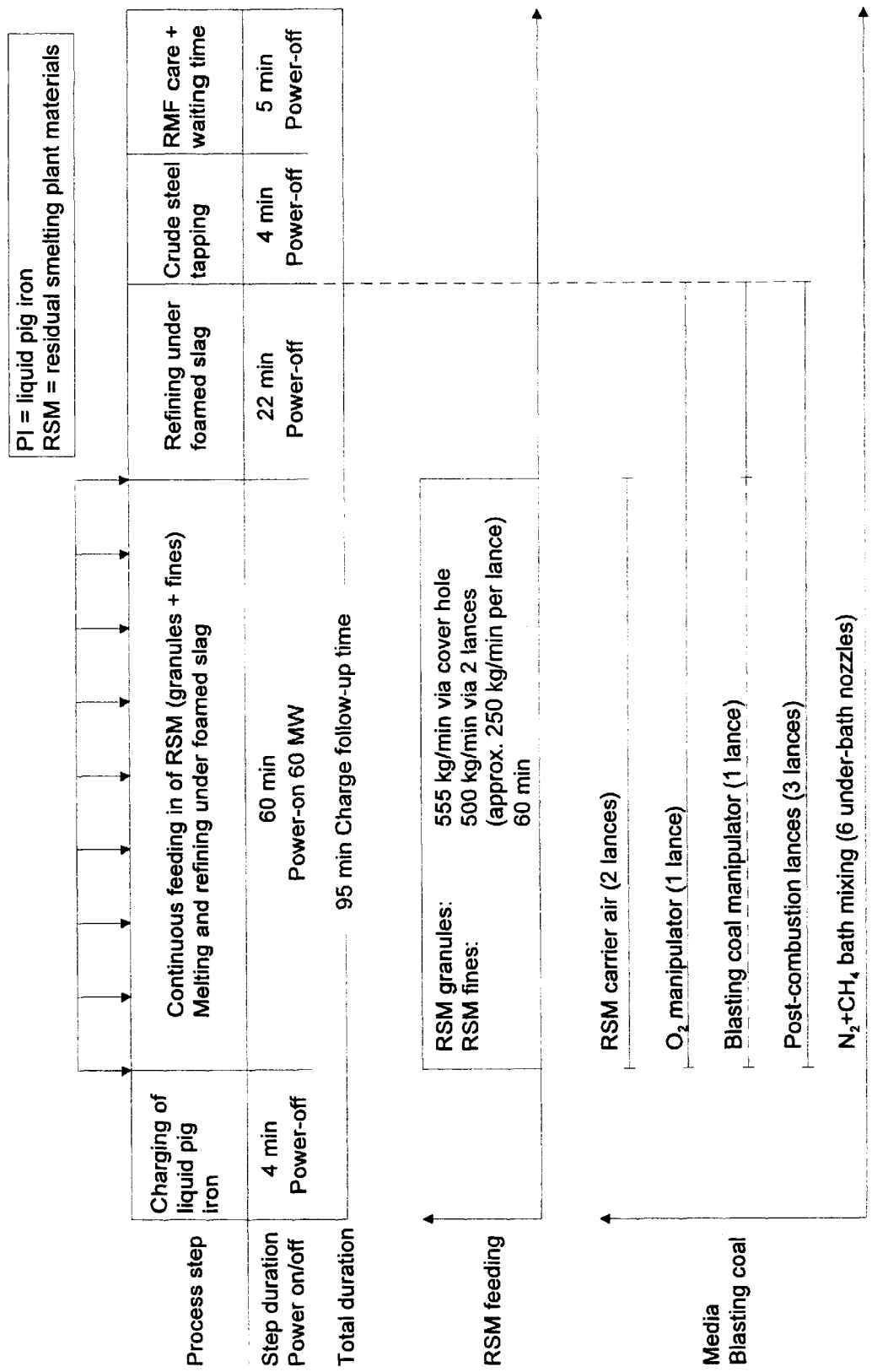
FIG. 2 reproduces the process sequence in the electric arc furnace for an exemplary embodiment.

The process sequence for the exemplary embodiment described above can be taken from FIG. 2.

What is claimed is:

1. Method for producing an iron melt using iron containing residual smelting plant material characterized by the combination of the following features:

processing residual plant materials into agglomerates, charging the agglomerates into an electric arc furnace being operated with foamed slag, melting and reducing the agglomerates in a pig iron melt, thereby producing a further melt, and refining the further melt.

2. Method according to claim 1, characterized in additionally charging the electric arc furnace with liquid or solid or liquid and solid pig iron, which is likewise refined.

3. Method according to claim 2, characterized in charging the pig iron at least partially before the residual smelting plant materials.

4. Method according to claim 3, characterized in that the pig iron is substituted partially or entirely by a carburized residual liquid pool.

5. Method according to claim 2, characterized in that residual smelting plant materials are charged in an amount of at least 5% of the total charge.

6. Method according to claim 5, characterized in that residual smelting plant materials are charged in an amount of approximately 40 to 50% of the total charge.

7. Method according to claim 1, characterized in that crude steel, semisteel or liquid pig iron is produced as the metal product.

8. Method according to claim 1, characterized in that a crude steel with a carbon content of at most 0.1 weight % is produced.

9. Method according to claim 1, characterized in that rolling scale slurry is charged as the residual smelting plant material.

10. Method according to claim 1, characterized in that dusts or slurries or both from at least one of a converter, the electric arc furnace, a pig iron production installation and a direct reduction installation are charged as residual smelting plant material.

11. Method according to claim 1, characterized in that the residual smelting plant materials are mixed before charging and have a calcined lime (CaO) binder, whereupon the residual smelting plant material are agglomerated and the agglomerates thus formed are dried to a residual moisture content of less than 5%.

12. Method according to claim 1, characterized in that first of all pig iron is charged into the electric arc furnace and then the residual smelting plant materials are continuously charged over a period of time and, during this time, the refining process is carried out.

13. Method according to claim 1, characterized in that refining takes place for a time without any charging of residual smelting plant materials being carried out.

* * * * *